Sept. 20, 1971 S. J. FISH 3,605,241
METHOD AND APPARATUS FOR SECURING PADS TO EYEGLASS FRAMES
Filed May 28, 1969 5 Sheets-Sheet 1

INVENTOR
Stanley J. Fisk
BY
Dominik, Knechtel & Godula
ATTYS

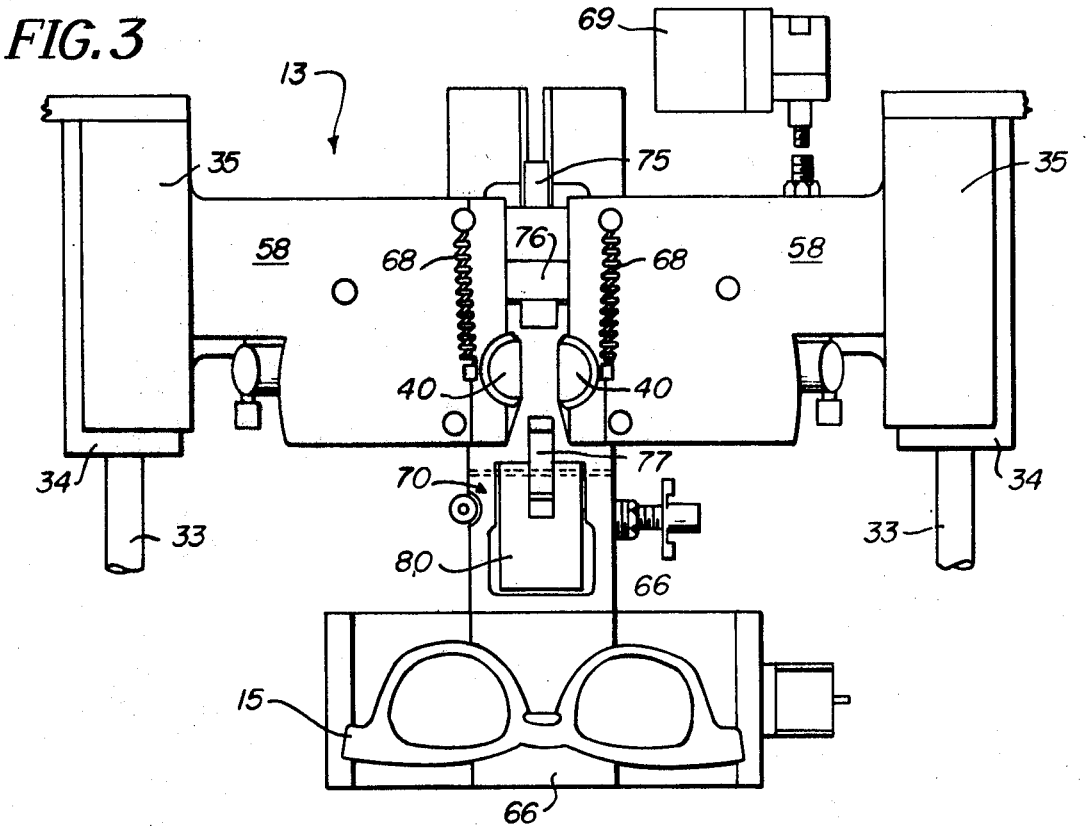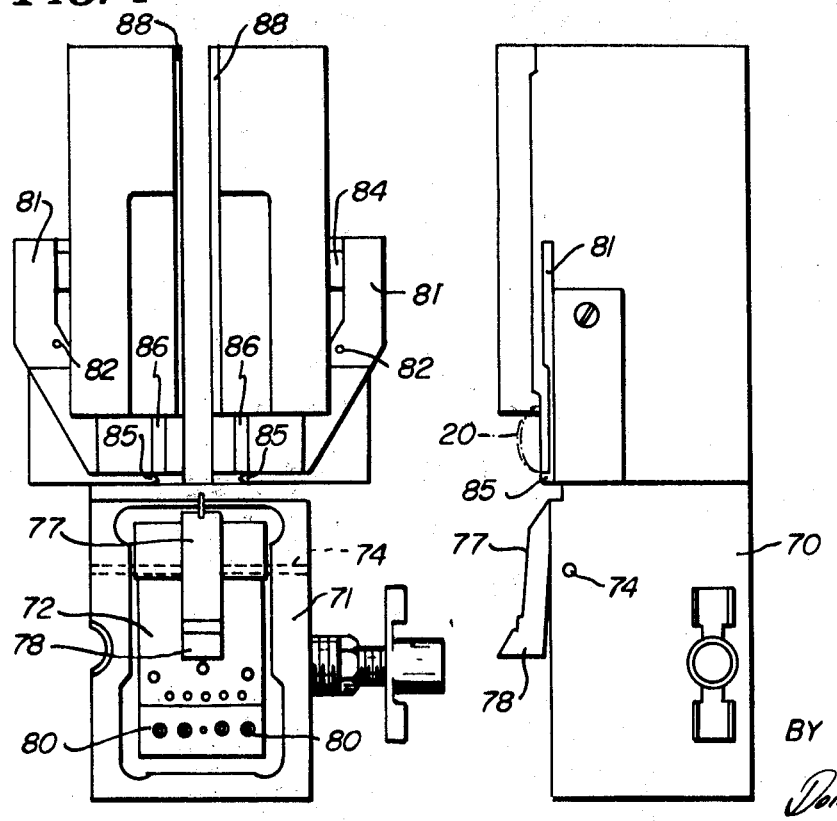

INVENTOR
Stanley J. Fisk
BY
Dominik, Knechtel & Godula
ATTYS.

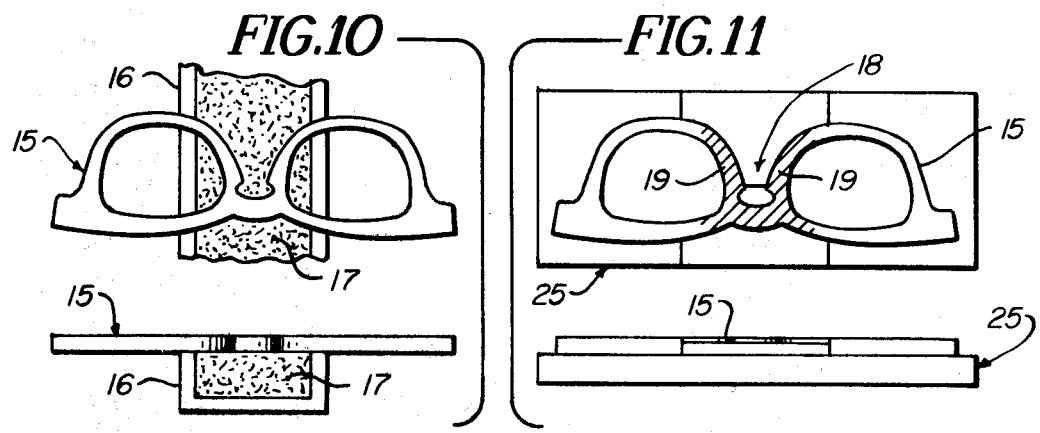
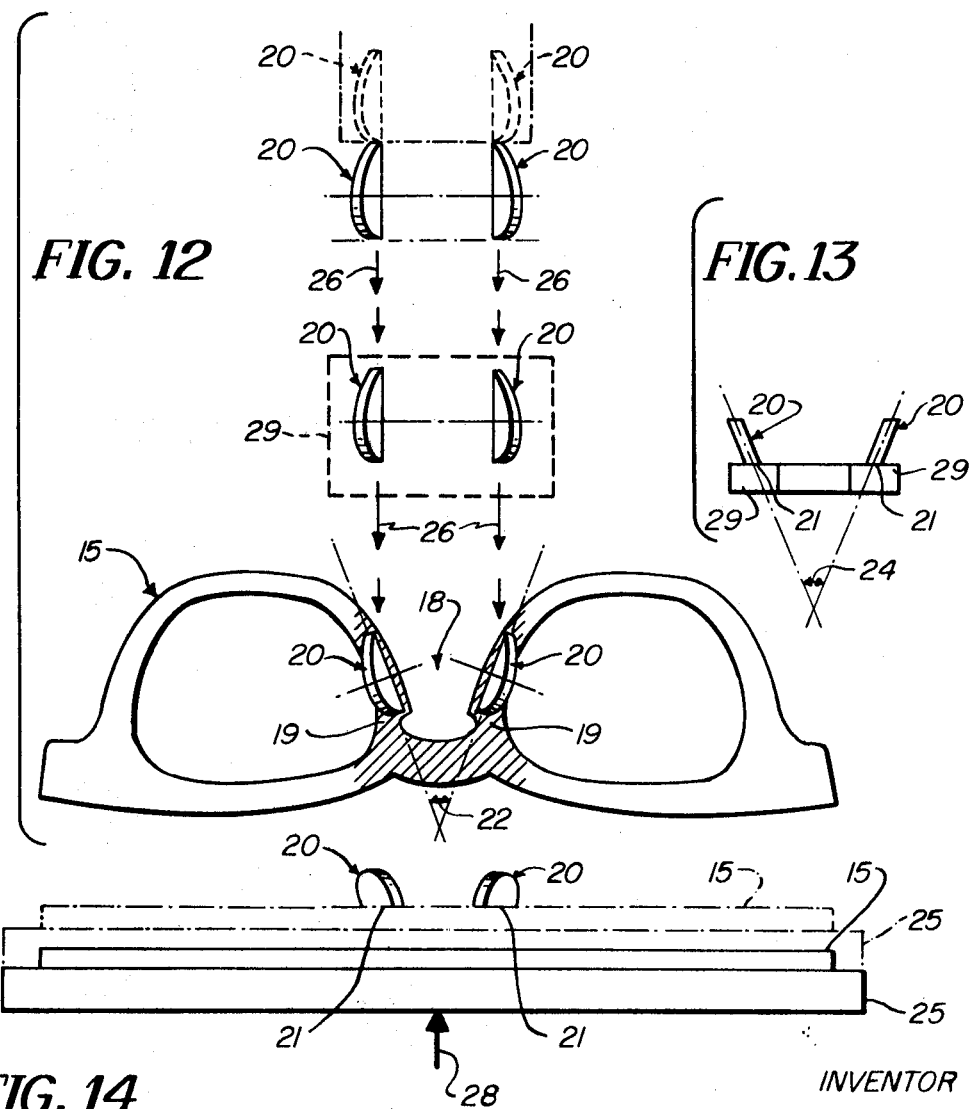

United States Patent Office 3,605,241
Patented Sept. 20, 1971

3,605,241
METHOD AND APPARATUS FOR SECURING PADS TO EYEGLASS FRAMES
Stanley J. Fisk, Niagara Falls, Ontario, Canada, assignor to Automation Devices, Inc., Fairview, Pa.
Filed May 28, 1969, Ser. No. 828,539
Int. Cl. B23p *19/04;* B29d *12/02*
U.S. Cl. 29—208                                                                    12 Claims

ABSTRACT OF THE DISCLOSURE

A method for transporting and positioning the nose pads for an eyeglass frame at the proper angle for securement, subsequently rotating the same along the axis for centering the V-notch nose portion of the eyeglass frame, and then moving the eyeglass frame into position for gluing by moving the eyeglass frame to engage the nose pads. The apparatus contemplates a reciprocating sliding clamp assembly with rotatable pairs of jaws for holding the nose pads oriented for rotation on an axis perpendicular to that of reciprocation of the assembly. The jaws are actuated by a centering device when moved into engaged relationship therewith, the centering device positioning the jaws and their nose pads immediately above the eyeglass frames, the frames then being moved upwardly into contact with the nose pads and thereafter the nose pads are secured by gluing or other means to the eyeglass frame.

---

The present invention relates to a method and apparatus for securing nose pads to eyeglass frames. In one specific embodiment the apparatus discloses a pair of vibratory feeders for delivering the nose pads to a longitudinal track, grasping the same by means of a pair of jaws oriented for positioning the nose pad on the eyeglass frame, and rotating the same into final position whereupon the frame is brought into contact with the pad. In the preferred embodiment, a solvent is applied to the frames as well as to the nose pads prior to joining.

Plastic eyeglass frames, in order to insure long life and good strength characteristics, are punched from laminated plastic. The nose pads which fit in the V-notch between the eyeglasses and ride upon the nose are separately formed, and presenty applied by hand to the frames in a gluing operation. The proficient operators, gluing by hand, are able to glue approximately 1,400 frames per day. In many eyeglass manufacturing plants, this constitutes a limitation on overall production.

Furthermore, when the nose pads are positioned on the frames by hand, variations in position occur which, of course, do not permit precise standardization of distances based upon preselected measurements of nose bridges and models and shapes of glasses. Also the training time for an operator to work efficiently at the 1,400 frames per day rate is anywhere from one to three months. During the period of training necessarily a high percentage of rejects can be anticipated.

The present invention has for a principal object a method of positioning nose pads on an eyeglass frame which insures dimensional stability, a high degree of quality, and an adequate seal at the joint between the nose pads and the eyeglass frame.

In addition to the method, the invention contemplates an apparatus which will permit a speed of gluing or otherwise securing the nose pads to 10 eyeglass frames per minute. This permits a theoretical speed of 4,800 frames per day. Actually, allowing for inspection, rejects, coffee breaks, machine breakdown, loading time, and the like, the production of one machine should process up to 3,500 units per day.

A further object of the invention looks to a timing cycle and positioning a pair of the subject machines for securing nose pads to eyeglass frames so that one operator can operate two machines, thereby doubling the production to approximately 7,000 frames per day, exactly five times the present capacity of one operator at a rate of 1,400 per day.

A more detailed object of the present invention is to fix the orientation of the nose pads to the eyeglass frames to the end that a dimensional standardization is achieved. A related object, because of the precise positioning and repetitive nature of the operation, results in reducing bubbling, flaws in gluing, and other inaccuracies in the assembly.

Still another object of the present invention is to provide a machine for automatically securing nose pads to eyeglass frames which is fully adjustable dimensionally, and which, with minor tooling modifications, can be made to automatically assemble nose pads to eyeglass frames which vary widely in exterior configuration and material.

An even more specific object of the invention is to provide a machine for securing nose pads to eyeglass frames which has a separate station for pre-conditioning the eyeglass frames with a solvent, prior to positioning the same for receiving a pair of nose pads which are also preconditioned with an appropriate solvent so that the interface is prepared on both sides prior to positioning for setting and gluing.

Yet another object of the present invention is to provide a machine for automatically securing nose pads to eyeglass frames which adapts itself to a wide variety of chemical solutions, and with minor modifications, can employ ultrasonic radio frequency, and other sealing techniques due to the ability of the unit to preselectively and positively orient the nose pads with relation to the eyeglass frame.

Further objects and advantages of the present invention will become apparent as the method and apparatus are illustrated in the accompanying drawing in which:

FIG. 3 is a top view, partially broken, of the moving assembly shown in FIG. 2.

FIG. 4 is a top view of the central portion of the assembly shown in FIG. 3 illustrating in detail the mechanism for applying solvent to the nose pads.

FIG. 5 is a side elevation of the assembly shown in FIG. 4.

FIG. 10 is a combination top and front elevational view illustrating the method of preconditioning the eyeglass frame.

FIG. 11 is a top and front elevational view of the preconditioned eyeglass frame positioned for receiving the nose pads.

FIG. 12 is a top view partially diagrammatic illustrating the path of the nose pad as it is fed into position for final orientation to be secured to the eyeglass frame in accordance with the method illustrated.

FIG. 13 is a front view illustrating the orientation of the nose pads at their mid-position in FIG. 12.

FIG. 14 is a front elevation partially diagrammatic showing the relationship between the nose pad and the eyeglass frame at the final position of attachment as illustrated in FIG. 12.

Figure 1:
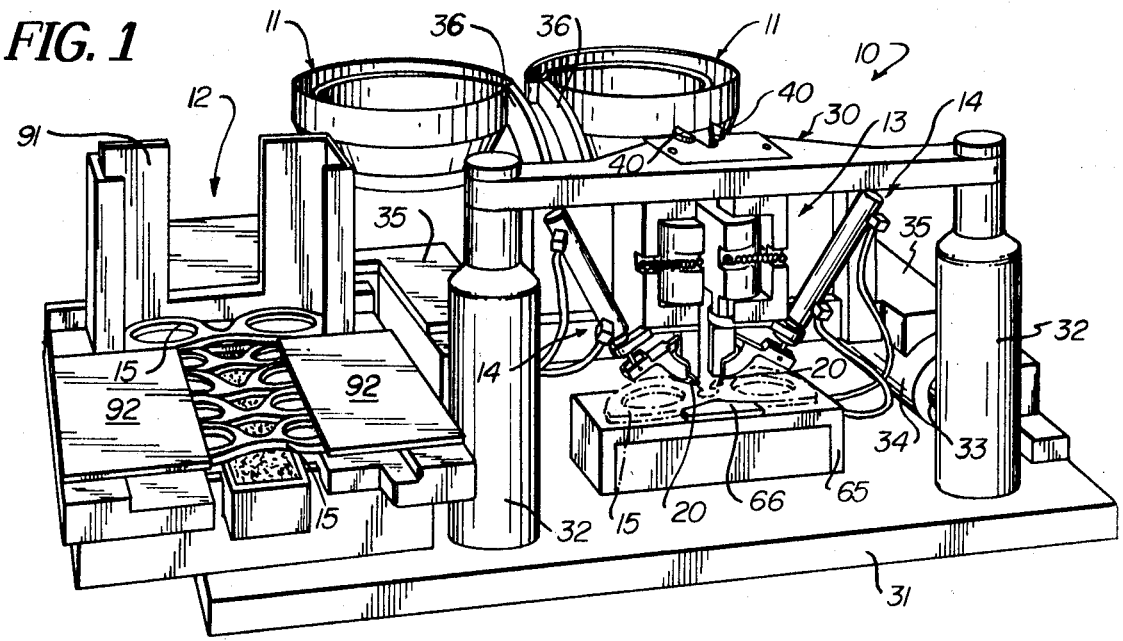
FIG. 1 is a front perspective view of the eyeglass pad assembly machine taken from an elevation slightly above the base of the unit.

The operation and construction of the assembly machine as shown in its completed operative form in FIG. 1 will be better understood after a detailed review of the method of assembly illustrated in FIGS. 10 through 14 inclusive.

Referring now to FIG. 10, it will be seen that the eyeglass frame 15 which has been pre-punched from a sheet of laminated plastic material is placed over a solvent applicator 16. The solvent applicator 16 which is especially proportioned for the eyeglass frame 15 has a solvent wick 17 in the interior portion which is presoaked with a suitable solvent to prepare the eyeglass frame 15 for the attachment of the nose pads 20. After a dwell period atop the solvent wick 17 appropriate to the solvent employed, the eyeglass frame 15 is thereafter inverted and placed atop the frame support 25 as illustrated in FIG. 11. There it will be seen that the nose crotch 18 of the eyeglass frame 15 has an adjacent area shown shaded, which is the treated area 19 having been in contact for a preselected time period with the solvent wick 17. At this point in time, the eyeglass frame 15 as shown in FIG. 11 is ready to receive the nose pads 20.

In timed relation to the preparation of the eyeglass frame 15, while the treated area 19 is being soaked, the nose pads 20 as shown in the upper portion of FIG. 12 are aligned, and proceed down parallel paths 26 as illustrated. The nose pad bases 21 (particularly see FIG. 13) are angled so that a plane passed through the body of the nose pads 20 in their paired relationship defines a pad angle 24 as illustrated by the intersection of the center lines of the nose pads 20 in FIG. 13. Another angle requires definition prior to securing the nose pads 20 to the eyeglass frame 15. This angle is the crotch angle 22 as shown in the bottom portion of FIG. 12 by the intersection in the plane of the eyeglass frame of the plane passing through the bodies of the nose pads 20 and identified by reference numeral 22, the crotch angle.

It thus becomes apparent that the nose pads 20 have a left side and a right side and travel in the parallel pad path 26 as shown in FIG. 12 at this time oriented to define only the pad angle 24. The nose pads 20 then are positioned atop the nose pad solvent applicator 29 shown in the mid-portion of FIG. 12 until the nose pad bases 21 are suitably treated with solvent or cement, preselected for the purpose. Thereafter the treated nose pads 20 continue down the pad paths 26 until immediately atop their position on the treated area 19 of the eyeglass frame 15. The nose pads 20 are then rotated around an axis perpendicular to the plane of the eyeglass frame 15 (the axis defined in FIG. 12 by the intersection of two center lines) until the crotch angle 22 is defined. Thereafter, as illustrated diagrammatically in FIG. 14, the frame support 25 is moved upwardly through the frame path 28 until, as shown in phantom lines, the eyeglass frame 15 is brought into contact with the nose pads 20, and the nose pad bases 21 are brought firmly and in physical contact with the treated area 19 of the eyeglass frame 15. The nose pads 20 and the eyeglass frame 15 are then held in this configuration until sufficient time has passed to bond the nose pads 20 to the eyeglass frame 15.

Summarizing the method described above in connection with FIGS. 10 through 14 inclusive, it will be seen that the nose pads 20 have been longitudinally oriented in parallel relationship at their predetermined pad angle relationship with the eyeglass frame 15. At or about the same time, the eyeglass frame 15 is pre-treated and, in the preferred embodiment shown, fixed to a movable frame support 25. Thereafter the nose pads 20 are secured by transporting through the parallel paths and are preconditioned with a solvent through the medium of a solvent pad applicator 29. The nose pads 20 are thereafter translated until they are immediately atop the eyeglass frame 15, already established in their center distance relationship. The nose pads 20 are then rotated until the crotch angle 22 is defined, the angularity of each of the nose pads 20 with regard to the vertical axis of the eyeglass frame 15 being one-half the crotch angle 22. The frame 15 is then brought into physical contact with the nose pads 20 and permitted to set until the support can be removed from the nose pads 20, and they will remain in their fixed secured angular relationship with the eyeglass frame 15.

A preferred apparatus for carrying out the method just described is shown in FIG. 1 identified generally as an assembly machine 10. There it will be noted that a pair of nose pad feeders 11 of the vibratory type deliver the left and right nose pads 20 to reciprocating pad transfer assembly 13. The transfer assembly 13 has as its principal operating element the pivoted pad clamp assembly 14, an opposed pair of which grasp and transfer the nose pads 20. Shown in the left hand portion of FIG. 1 is the frame feeder assembly 12 in which the eyeglass frames are preconditioned for positioning in juxtaposed relationship to the pivoted pad clamp assembly 14.

Figure 2:
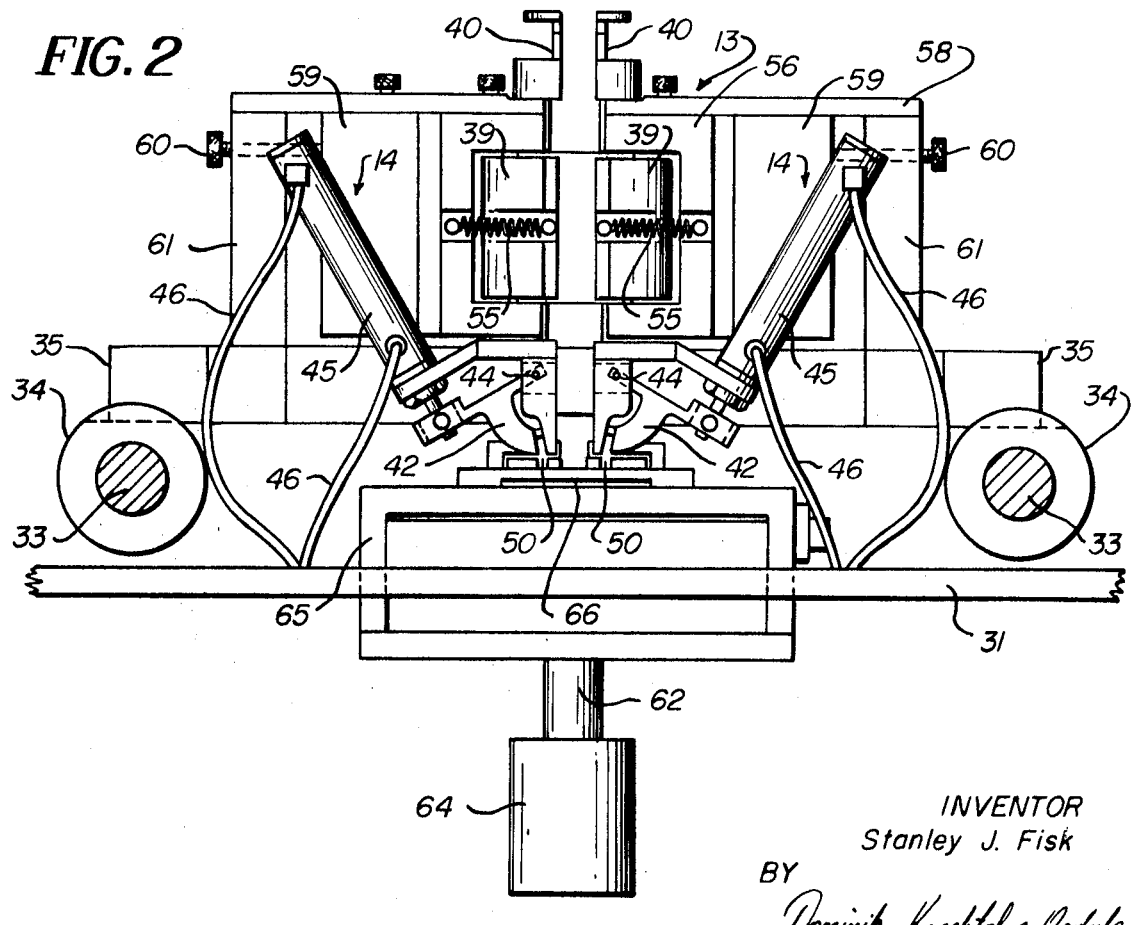
FIG. 2 is a front elevation of the moving portion of the assembly machine shown in FIG. 1.

In order to transfer the nose pads 20 from the delivery occasioned by the tracks 36 from the nose pad feeders 11, the pivoted pad clamp assembly 14 is mounted on a reciprocating pad transfer assembly, generally shown in FIG. 2. Reciprocation is defined and confined by means of a pair of parallel slide shafts 33 on which the slide blocks 34 are mounted and secured to the transfer assembly base 35. As the transfer assembly reciprocates, it engages at one end of the stroke the centering fixture 30 which is supported by means of the centering fixture support post 32 extending upwardly from the machine frame 31. The slide shafts 33 are secured at one end of the centering fixture support post 32 as illustrated in the lower right hand corner of FIG. 1.

Figure 6:
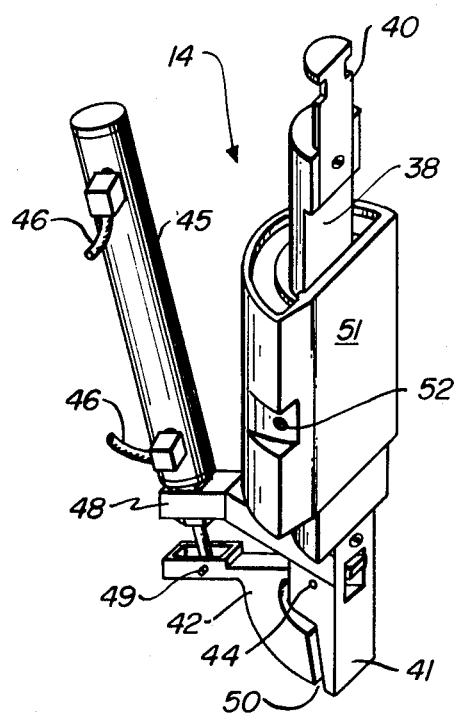
FIG. 6 is a partially broken perspective view of the rotating nose pad clamp assembly.

The transfer of the nose pads 20 to the eyeglass frame 15 is physically accomplished by the pivoted pad clamp assembly 14 shown in perspective detail in FIG. 6. The pad clamp assembly 14 includes a pivot body 38 which is secured to a crescent-shaped bearing race support 39, the pivot body 38 terminating at its upper portion at the centering engagement cam assembly 40. At the lower end of the pivot body 38 is an anvil 41 which coacts with a pivoted jaw 42 to clamp the nose pads 20 while the clamp assembly 14 is reciprocated on the pad transfer assembly 13. The pivoted jaw 42 swings about a pivot 44 in the lower portion of the pivot body 38. Actuation is provided by means of the pneumatic pivot cylinder 45 which is driven by air supplied through the air hoses 46. A support arm 48 extends from the pivot body 38, and the pneumatic pivot cylinder 45 is secured thereto. Extending from the opposite portion of the support arm 48 is a jaw actuating pin 49 which operates to close the clamp 50 defined by the opposed faces of the inner portion of the anvil 41 and the terminus of the pivot jaw 42.

Other details of the pivot pad clamp assembly 14 include a locking plate 51 which secures the crescent-shaped bearing race support 39 to the pivot body 38. A spring eye 52 is also provided in a recessed portion of the crescent-shaped bearing race support 39 to receive the jaw spring 55 (see FIG. 2) which serves the function of yieldably biasing the clamp portion 50 in parallel relationship.

The pivoted pad clamp assembly 14 fits within the C-shaped jaw body mount 56 of the reciprocating pad transfer assembly 13 as shown in FIG. 1. At the upper and lower portion of the crescent-shaped bearing race support 39 bearing races are provided to pivotally mount the pad clamp assembly so that the clamp portion 50 can rotate about a vertical axis. A top plate 58 is provided to secure the assembly, and back plates 59 further secure the assembly. Also limit stops 60 are provided in the upright supports 61 for the top plate 58 to control the movement of the pivoted pad clamp assembly 14.

The frames 15 are moved upwardly when the nose pads 20 are in position for gluing. As will be seen from a joint view of FIGS. 1 and 2, a lifting shaft 62 is operated by means of a drive cylinder 64 to elevate the frame support 65 into close proximity with the clamp 50. Particularly as shown in FIG. 1, a frame stop 66 is provided so that the operator can position the frames in their exact relationship on the frame support 65, and thereafter actuate the assembly machine to deliver the pads into position for securing on the eyeglass frames 15. In FIG. 3, the top view, it will be further observed that centering springs 68 are employed to constantly urge the centering engagement cam 40 of the pivoted pad clamp assembly 14 into parallel relationship. Additionally, a back stop assembly 69 is provided to adjustably determine the rearward position of the reciprocating pad transfer assembly 13. The glue pad assembly 70 for coaction with the nose pads 20 is referenced generally in FIG. 3, but more specifically in FIGS. 4 and 5. In FIG. 4 it will be seen that the glue pad 72 is positioned within the glue pot 71 and pivoted about a glue pad pivot pin 74 so that it can bob up and down in the glue. A glue pad actuating block 75 (see FIG. 3) is provided on the reciprocating member to engage the glue pad actuating finger 77 which in turn raises the glue drop 80 portion of the glue pad 72 to position drops of glue on the bottom of the nose pads 20 as they pass the glue pad assembly 70. The finger hook 78 is provided to depress the glue pad 72 after the assembly has passed the unit, and clear the same for another cycle. A slide rail 76 (see FIG. 3) is provided on the reciprocating pad transfer assembly 13 to assist in the continued alignment of the pivoted pad clamp assembly 14. The feeder rails 88 coact with the feeder track 36 to deliver the nose pads into the pad orienting slots 86. The nose pads 20 are constantly brought forward in chain style to this position, and held within the pad orienting slots 86 by means of a retainer 81. The retainer 81 is pivoted about the retainer pivot 82 and urged into locking position by means of retainer spring 84. The stop finger 85 at the remote end of the retainer 81 engages the front edge of the nose pad 20 generally as shown in FIG. 5. Thus the nose pad 20 is always in fixed position awaiting the rearward stroke of the reciprocating pad transfer assembly 13 and engagement by the clamp 50. Once the clamp 50 has engaged the nose pad 20, and the reciprocating pad transfer assembly 13 moves forwardly, the force of the movement of the nose pad 20 held securely by the clamps 50 pass the stop fingers 85 and then move the nose pads 20 forwardly. As mentioned before, the glue pad actuating block 75 is then engaged, and the glue pad drop 80 presented to the bottom of the nose pads 20 which are then ready for positioning directly atop the eyeglass frame 15.

Figure 7:
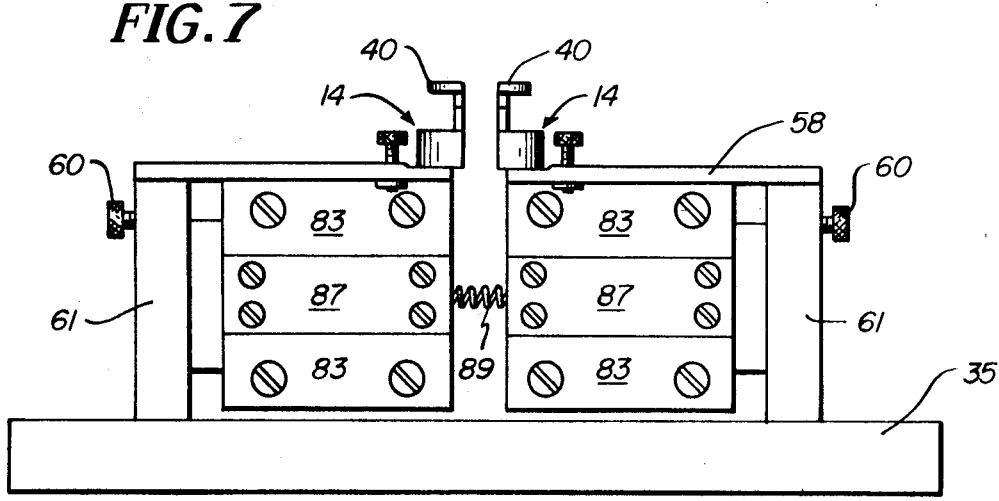
FIG. 7 is a rear view of the sliding jaw assembly.

Adjustability and constant spring loading to eliminate backlash has been provided throughout the assembly. As discussed above, the back-stop assembly 69 positions the rearward travel of the reciprocating pad transfer assembly 13. As shown in FIG. 7, a compression spring 89 constantly urges the pivoted pad clamp assembly 14 outwardly against the action of the limit stop 60. The same are adjustably mounted within the general housing shown in FIG. 7 defined by the top plate 58, the back plates 59, the top plate upright support 61, and the transfer assembly base 35. The guide plates 83 flankingly engage the spring supports 87 and provide further for the adjustable mounting of the pivoted pad clamp assembly 14.

Figure 8:
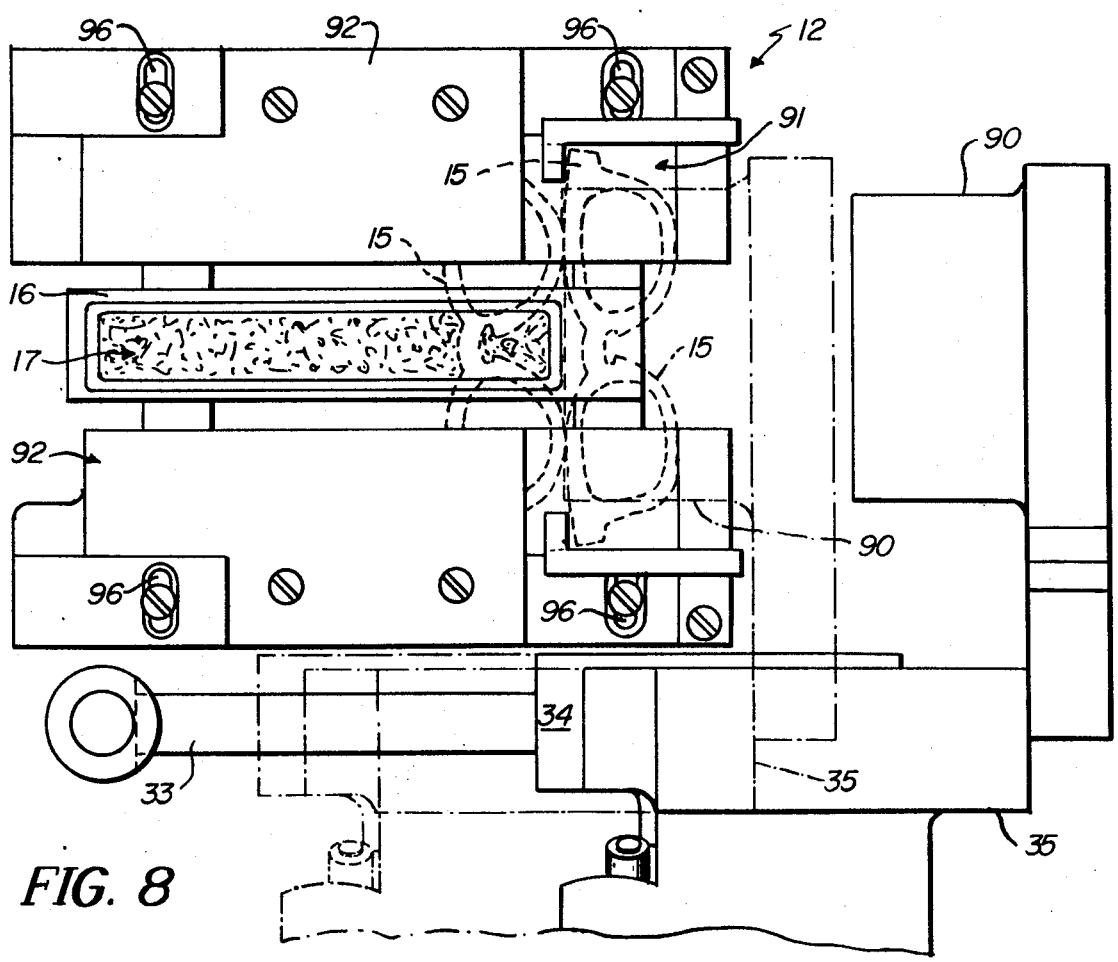
FIG. 8 is a top view of the eyeglass frame feeder and conditioner.

Another aspect of the apparatus as shown generally in FIG. 1 relates to the frame feeder assembly 12 which is shown positioned on the side of the assembly machine 10. In greater detail, it will be seen in FIG. 8 that the frame feeder assembly 12 includes a frame feed tongue 90 which is secured to the transfer assembly base 35 and therefore reciprocates in timed relation with the transfer assembly. A frame magazine 91 is provided in which the frames are stacked vertically (see also FIG. 1), the bottom ones of which are successively engaged by the frame feed tongue 90. Guide plates 92 overlie the frames 15 as they pass over the frame solvent wick 17 contained by the frame solvent container 16. The length of the frame solvent container 95 is determined based upon the machine speed to continue the frames 15 in contact with the solvent delivered by the frame wick 94 for a sufficient time to soften the frames 15 for positioning and assembly. It will be further noted in FIG. 8 that adjustable mounts 96 are provided which permit the width of the frame magazine 91 to be adjusted, thereby in keeping with one of the objects of the present invention to provide an assembly machine which was flexible and adaptable to a wide variety of frame configurations.

Figure 9:
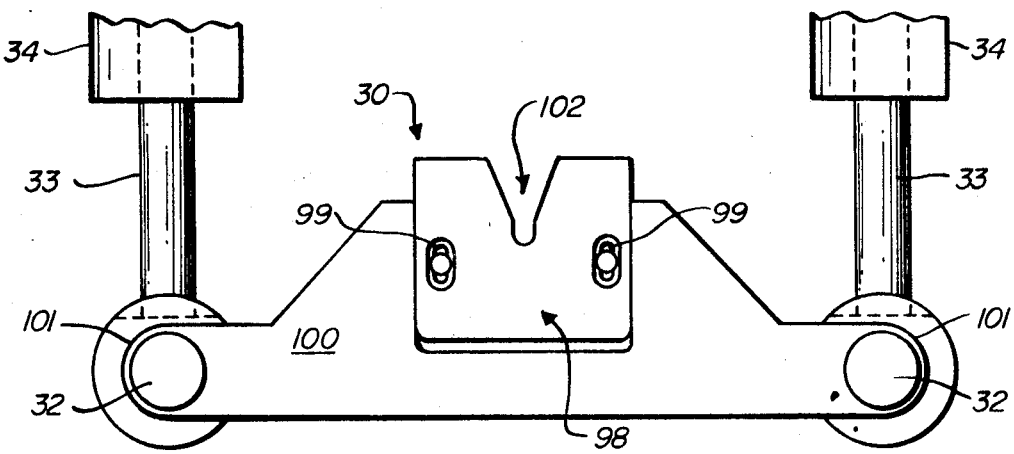
FIG. 9 is a top view of the nose pad centering fixture.

As discussed previously, the centering engagement cam 40 of the pivoted pad clamp assembly 14 as it is moved forwardly engages the centering fixture 30 generally as shown in FIG. 1. More specifically, with reference to FIG. 9, it will be seen that the centering fixture 30 includes a centering plate 98 which is adjustably mounted by slots 99 to the centering fixture bridge 100. The bridge itself has two end portions 101 which are fixedly secured to the centering fixture support posts 32 and thus the entire centering fixture assembly 30 is fixedly immovable on the machine frame. The immovability provides for the centering engagement cam 40 to engage the V-notch 102 in the centering plate 98 at a predetermined angle 104 which is the crotch angle 22 of the nose pads 20. The pad angle of the nose pads is determined by the configuration of the clamp 50 portion of the pivoted pad clamp assembly 14.

The operation of the assembly machine 10 will serve as a review of its construction. The operator (see FIG. 1) pushes a stack of eyeglass frames 15 within the frame magazine 91 of the frame feeder assembly 12. Nose pads 20 are positioned within the nose pad feeders 11 and are thereby delivered by means of the tracks 36 to a pad orienting slot 86 (see FIG. 4). When the unit is actuated for the reciprocating pad transfer assembly 13 to move forwardly, in timed relationship the clamps 50 are closed on the nose pads 20, and move the nose pads 20 forwardly by disengaging the stop fingers 85 of the retainers 81. The glue pad 72 is passed, and the glue pad actuating block 75 engages the glue pad actuating finger 77 to in turn position the glue drops 80 against the bottom of the nose pad 20. As the fixture moves forwardly, the centering engagement cams 40 at the top of the pivoted pad clamp assembly 14 nest within the V-notch 102 of the centering plate 98, and the pivoted pad clamp assembly 14 rotates centrally to position the angled nose pads 20 atop the eyeglass frames 15. Thereafter (see FIG. 2) the drive cylinder 64 is actuated to push the lifting shaft 62 upwardly which in turn elevates the frame support 65 until the eyeglass frame is in direct contact with the nose pad 20. A dwell period is cycled in timed relation to the necessity for setting the nose pads 20 on the eyeglass frame 15, and thereafter the pneumatic pivot cylinder 45 is actuated to pivot the pivoted jaw 42 releasing the same from the anvil 41 and opening the clamp 50 while the reciprocating pad transfer assembly 13 is moved rearwardly. At this point the operator removes the eyeglass frame 15 with the attached nose pads 20, places another eyeglass frame 15 in position having removed the same from the frame feeder assembly 12, and the cycle begins again as the clamps 50 engage another pair of nose pads 20 which have been moved into position in the pad orienting slots 86.

When different styles are employed, the eyeglass frame magazine 91 can be varied in size. Additionally, different centering plates 98 can be positioned on the bridge 100 of the centering fixture 30. The spring loaded members for urging the pivoted pad clamp assembly 14 into positive orientation constantly maintain a fixed reference for the positioning of the pads 20. The limit stops 60 provide for further center adjustment of the pivoted pad clamp assembly 14, and the back-stop assembly 69 can be further adjusted to terminate the rearward travel of the unit, the V-notch 102 in the centering plate 98 terminating the forward travel of the assembly.

The unit drives are desirably pneumatic operating at normal temperatures and metered to provide brisk reciprocating motion, and yet yieldable engagement at both limits. The pneumatic pivot cylinders 45, the reciprocating drive of the slide block 34 and slide shaft 33, as well as the drive cylinder 64 for the eyeglass frame support 65 are all driven in timed relation to microswitches to coordinate the operation. Safety buttons and the like can be provided for the operator to insure that the eyeglass frame 15 is fully installed atop the frame support 65 before actuating the unit.

It is further practical to omit the gluing step, and instead introduce a welding mechanism such as illustrated and described in U.S. Pat. No. 3,184,353 to form the joint between the pads and frames. Such equipment as manufactured by the Cavitron Company, known as its 900-2A unit may be adapted to generate the welding energy without substantial modification of the mechanism or method defined above.

While the invention has been described in connection with specific embodiments and applications, no intention to restrict the invention to the examples shown is contemplated, but to include within the invention all of that subject matter defined by the spirit as well as the letter of the annexed claims.

I claim:

1. The method of securing a pair of nose pads to an eyeglass frame simultaneously comprising the steps of:
    longitudinally orienting the pads in parallel relationship at their predetermined angularity with a frame,
    fixing the eyeglass frame to a movable member,
    transporting the pads by clamping members mounted for rotation in an axis perpendicular to the plane of the eyeglass frame,
    rotating the pads and fixing the center distance of the same positioned above the frame movable member,
    moving the frame and its movable member into contact with the pads in the final positional relationship between pads and frame, and
    fixing the dwell time and sealing environment between the pads and frame to secure the same to each other.

2. In the method of claim 1, securing the pads to the frame by welding.

3. In the method of claim 1, moving the frame upwardly against the nose pads.

4. In the method of claim 3, preconditioning the eyeglass frame and pad faces for an adhesive interfit.

5. In the method of claim 4, applying the adhesive to the interfaces of the nose pads while the same are being moved in parallel paths toward the eyeglass frames.

6. A mechanism for securing a pair of nose pads to an eyeglass frame comprising in combination:
    a machine base,
    an eyeglass frame supporting member mounted for movement perpendicular to the plane of the eyeglass frame with respect to the machine base,
    a reciprocating pad clamp assembly secured to the machine base for reciprocating motion in a plane parallel to the plane of the eyeglass frame and supporting member,
    a pair of pivoted pad clamp assemblies mounted in the reciprocating clamp assembly and journaled for rotation along an axis perpendicular to the plane of reciprocating motion of the pad clamp assembly,
    a pair of nose pad clamps at the base of each pivoted pad clamp assemblies,
    means feeding the pads to a position for engagement by the clamps,
    reciprocating drive means for the pad clamp assembly support to position the clamps to receive the nose pads and deliver the same to a position atop the eyeglass frame,
    a locating unit means secured to the frame supporting member proportioned to receive the pivoted pad clamp assemblies and centeringly rotate the same to position the pads in their predetermined relationships for attachment to the frames,
    means for moving the eyeglass frame supporting member and eyeglass frame relative to the nose pads into contact with the pads when the latter are in their predetermined relationship, and
    means for securing the pads to the frame.

7. In the mechanism of claim 6 a frame feeder assembly having tongue means for delivering a frame to the operator coupled to the reciprocating member.

8. In the mechanism of claim 6, a glue pot assembly beneath the path of the nose pad clamp, and means for applying adhesive to the nose pads in timed relation to the movement of the reciprocating assembly.

9. In the mechanism of claim 6, a V-notch positioned fixedly atop the machine base, and rotating cams atop the pivoted pad clamp assemblies to engage the V-notch and rotate each one-half the angle of the V-notch.

10. In the mechanism of claim 6, means for moving the eyeglass frames upwardly into engagement with the nose pads while the latter remain stationary.

11. In the mechanism of claim 6, centering springs yieldably urging all rotating and movable members against stops to provide a datum for adjustment.

12. In the mechanism of claim 6, welding means for securing the pads to the frames.

References Cited

UNITED STATES PATENTS

| | | | |
|---|---|---|---|
| 2,582,798 | 1/1952 | Russell et al. | 29—20X |
| 3,043,191 | 7/1962 | Lanski | 29—20X |

GIL WEIDENFELD, Primary Examiner

U.S. Cl. X.R.

29—20; 351—178